Aug. 4, 1970    J. R. EDMISTON ET AL    3,522,886
TANK-TYPE FILTER FOR POOL WATER AND THE LIKE
Filed Nov. 8, 1968    2 Sheets-Sheet 1
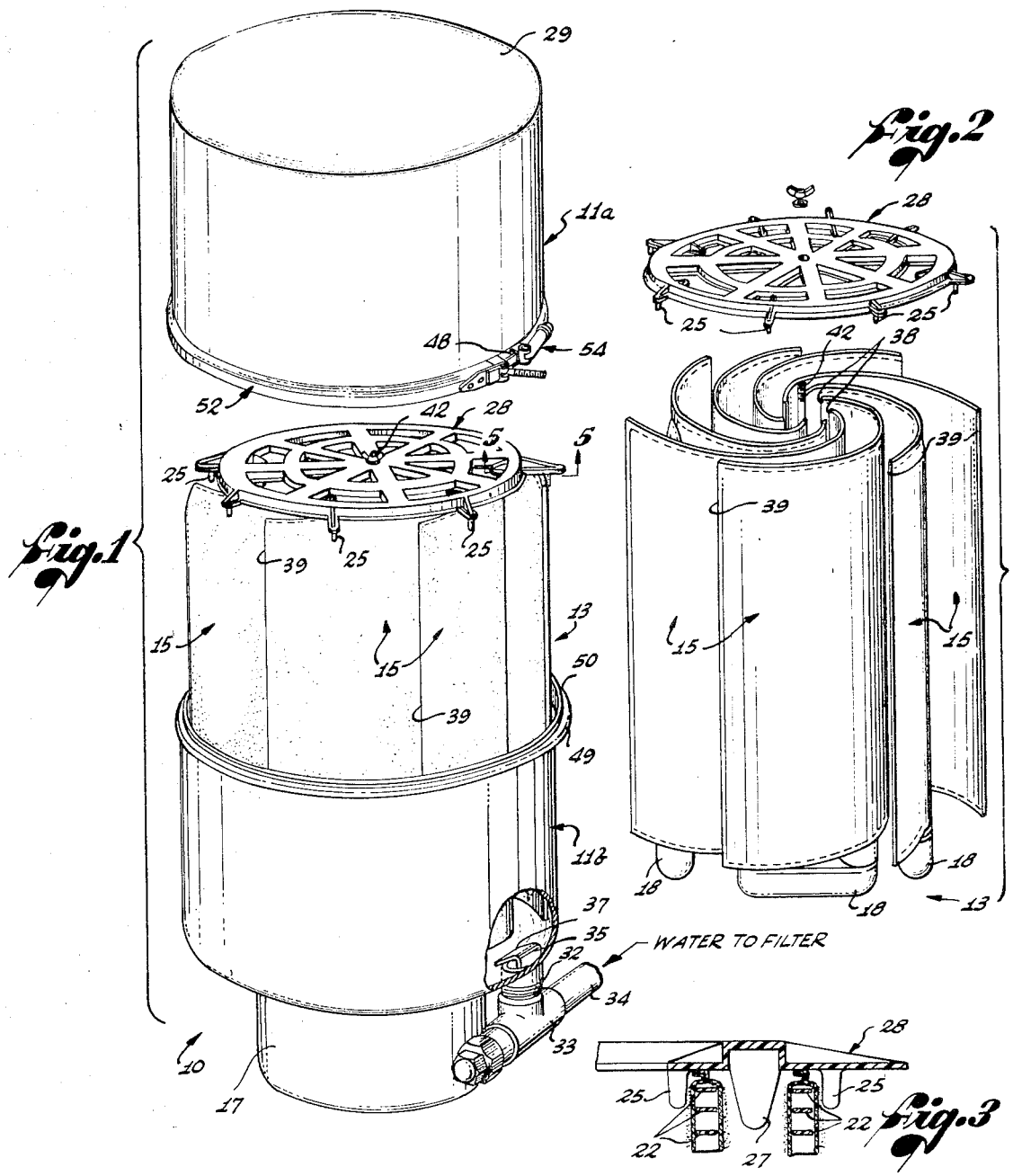
INVENTORS
JAMES R. EDMISTON
HARRY M. CLINTON
BY Fulwider, Patton, Rieber
Lee, and Utecht
ATTORNEYS

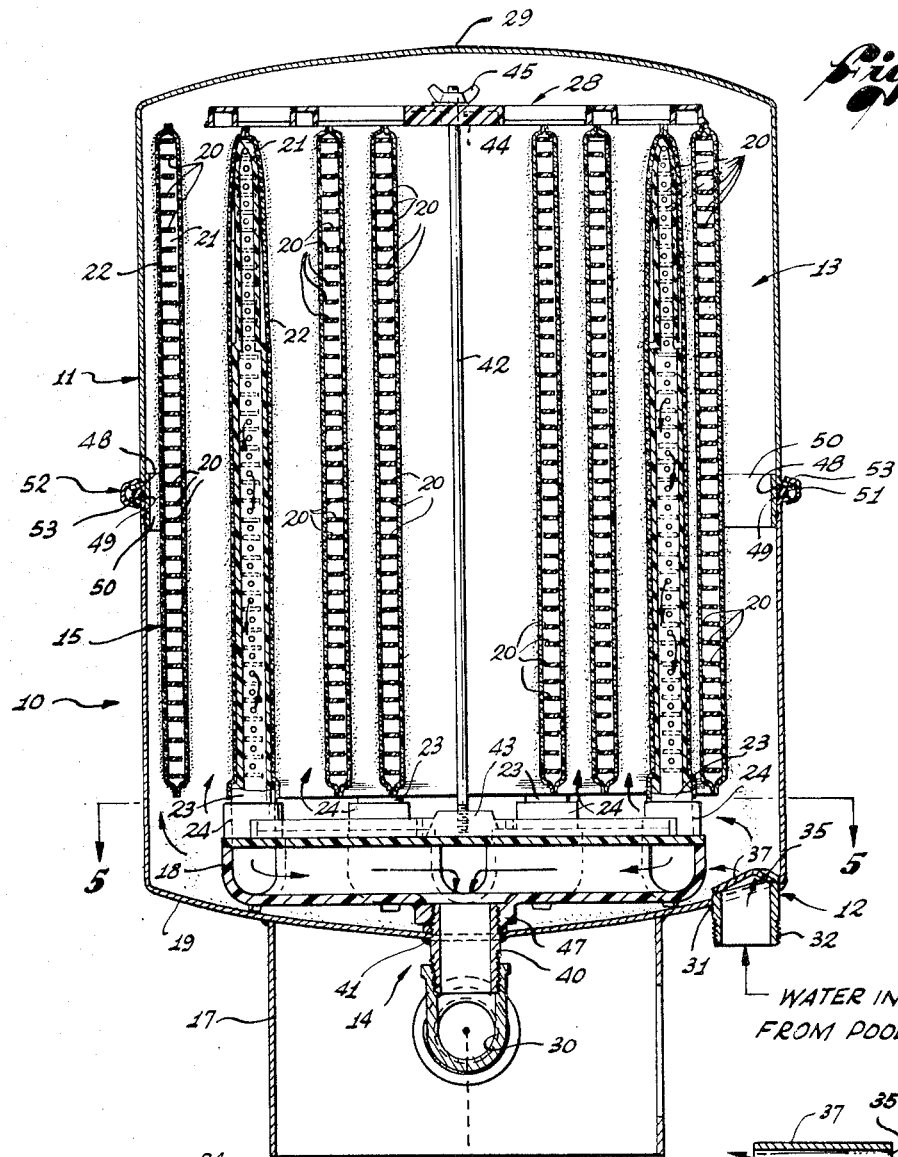

United States Patent Office 3,522,886
Patented Aug. 4, 1970

3,522,886
TANK-TYPE FILTER FOR POOL WATER
AND THE LIKE
James R. Edmiston, Sherman Oaks, and Harry M.
Clinton, Northridge, Calif., assignors to Swimrite,
Inc., Van Nuys, Calif., a corporation of California
Filed Nov. 8, 1968, Ser. No. 774,387
Int. Cl. B01d 25/08, 25/30, 37/02
U.S. Cl. 210—345                                                 13 Claims

ABSTRACT OF THE DISCLOSURE

A filter having a generally cylindrical tank with a filter assembly inside the tank comprising a plurality of hollow grids covered with fabric for holding a coating of diatomaceous earth. The grids are supported on a manifold threaded onto an outlet fitting welded in the bottom wall of the tank, and held in place by an upper support wheel connected to the manifold by a tie rod permitting removal of the assembly as a unit. The inlet is a pipe in the bottom wall adjacent the sidewall and having a deflector which directs the fluid along the bottom wall to create a swirling vortical flow for picking up diatomaceous earth and redistributing the same on the grids. The tank is in two sections including a cover for exposing a substantial portion of the filter assembly, and the sections have outwardly turned flanges clamped together by a split ring to compress a seal ring between the sections and an insert ring fast in one section.

BACKGROUND OF THE INVENTION

This invention relates to tank-type filters for cleaning flows of liquid, and has particular reference to the filtration of the water of swimming pools and the like, an effective filter medium for this purpose being diatomaceous earth which is used as a coating on fine mesh screening through which the liquid is passed to effect the desired filtration.

In one diatomaceous-earth pool filter, a number of filter elements in the form of hollow, fabric-covered grids are arranged compactly in a filter assembly providing a relatively large surface area of screening, and the asembly is mounted in a generally cylindrical tank into which the dirty water is pumped through the bottom wall, clean water being withdrawn from the center of the bottom wall through the filer elements and returned to the pool for re-use. Typically, a measured charge of diatomaceous earth is dumped into the tank on the intake side of the filter assembly to distribute itself over the fabric as an incident to the flow of water through the assembly to the outlet of the tank.

SUMMARY OF THE INVENTION

The primary object of the present invention is to provide an improved filter of the foregoing general character which maintains the effectiveness of the filter medium by insuring that virtually all of the charge is uniformly distributed on the filter elements despite a tendency of the medium to settle out of the assembly. More specifically, the improved filter produces a swirling vortical flow in the tank operable to pick up any settled-out filter medium and distribute the medium relatively uniformly over the filter elements as an incident to the flow of liquid through the filter, thus obtaining optimum utilization of available filter area and charge and permiting longer periods of filter operation between servicing.

In addition, the filter element assembly is of improved construction for insertion and removal of the entire assembly as a unit, and also to insure against accidental separation of the parts in use and the resulting return of dirty water to the pool. Moreover, the tank itself is specially constructed for ease of inspection, servicing and removal of the filter assembly.

Other objects and advantages of the present invention will become apparent from the following detailed description, taken in conjunction with the accompanying drawings.

BRIEF DESCRIPTION OF THE DRAWINGS

FIG. 1 is a partially exploded perspective view of a filter embodying the novel features of the present invention, the view showing the cover section of the tank raised to expose the filter assembly and part of the sidewall broken away to show the inside of the tank.

FIG. 2 is an exploded perspective view of parts of the filter assembly alone.

FIG. 3 is an enlarged fragmentary cross-section taken substantially along the line 3—3 of FIG. 1.

FIG. 4 is an enlarged cross-sectional view taken in a vertical plane substantially along the vertical axis of the filter and through the inlet thereof with the cover section in the closed position.

FIG. 5 is a cross-sectional view on a reduced scale taken substantially along the line 5—5 of FIG. 4 with the overlying positions of the filter elements shown in phantom lines.

FIG. 6 is an enlarged fragmentary cross-section in a transverse plane through one of the filter elements.

FIG. 7 is an enlarged fragmentary vertical cross-section through the inlet.

DETAILED DESCRIPTION

As shown in the drawings for purposes of illustration, the invention is embodied in a filter, indicated generally at 10 in FIGS. 1 and 4, and comprising a closed cylindrical tank 11 having an inlet 12 for a flow of dirty water to be cleaned, a filter assembly 13 inside the tank, and an outlet 14 (FIG. 4) through which the water flows after passing through the filter elements 15 making up the filter assembly. From the outlet, the filtered and clean water is returned to the point of use such as a swimming pool from which the dirty water was pumped to the filter.

Herein, the tank 11 is supported in an upright position on a hollow cylindrical base 17 and the filter assembly 13 is generally cylindrical in outside shape and substantially coextensive with the inside of the tank. The filter elements 15 are hollow grids upstanding within the tank from a collecting manifold 18 supported above the lower end wall 19, each grid comprising a series of vertically spaced, arcuate ribs 20 joined together by vertical posts 21 (see FIGS. 4 and 6), and a sack-like sheath 22 of suitable fabric covering for holding a coating of powdered filter medium such as diatomaceous earth. Depending from each grid is a pipe 23 which is fitted into a cup 24 on the manifold so that the interior of all of the grids communicate through the manifold with the outlet 14. These pipes also support the grids releasably on the manifold, and depending ribs 25 and 27 (FIG. 3) on a holding wheel 28 at the top of the assembly position the upper ends of the grids in properly spaced relation within the tank with the upper edges of the elements adjacent the upper end wall 29 of the tank.

With the foregoing arrangement, dirty pool water pumped through the inlet 12 in the lower end wall 19 of the tank 11 rises within and around the filter assembly 13 and is forced through the coating of diatomaceous earth into the grids 15. The filtered water then flows down through the manifold 18 to the outlet 14 for return to the pool through a pipe indicated at 30 in FIG. 4. When the filter medium is uniformly distributed over the filter elements, this arrangement is highly effective in cleaning the water.

In accordance with a primary aspect of the present invention, the inlet flow of dirty water is admitted through the bottom wall 19 at a point spaced outwardly from the center, and is directed against the bottom wall and outwardly toward the cylindrical sidewall to create a swirling vortical flow that wipes along the bottom wall to pick up any settled-out diatomaceous earth thereon, and then rises within the tank to carry the diatomaceous earth upwardly for redistribution over the filter elements 15. Thus, the filter 10 prevents compaction of the diatomaceous earth and maintains the charge of earth in position to utilize it most effectively, despite the tendency of the earth to settle away from the filter elements.

As shown most clearly in FIGS. 1, 4 and 5, the inlet 12 is a short section of pipe extending upwardly through the bottom wall 19 adjacent the cylindrical sidewall of the tank, parallel to the tank axis, and welded in place at 31 (FIG. 4). The lower end portion of the inlet pipe is threaded at 32 to receive a T fitting 33 (FIG. 1) on the end of a supply pipe 34. Connected to the radially outer side of the inlet, within the tank 11, is a generally L-shaped baffle plate having an upright flanged edge portion 35 connected to the inlet pipe, and a bent-over portion 37 overlying the inlet and positioned to deflect incoming water laterally, and slightly downwardly, across the downwardly dished bottom wall 19, generally along a chord of the wall extending between the inlet and the center of the tank. In addition, the flat deflector portion 37 of the baffle has the effect of spreading the incoming flow of water along the bottom wall. Accordingly, the incoming water impinges against and washes along the bottom wall and is diverted by the cylindrical sidewall into an upwardly swirling, vortical flow within the tank so that any diatomaceous earth that has settled onto the bottom is entrained in the flow and carried upwardly with the water.

As shown most clearly in FIGS. 2 and 5, the assembly of arcuate filter elements 15 is pinwheel-shaped in transverse cross-section, each element having one longitudinal edge 38 adjacent the center of the assembly and the other edge 39 adjacent the outer periphery, and the inward curvature of the elements is in the same direction as the curvature of the vortical flow. Thus, the swirling water enters between the spaced elements and continues swirling upwardly through the assembly, and also swirls upwardly around the assembly, for optimum vertical penetration and redistribution of diatomaceous earth along the full length of each element.

Another feature of the filter 10 is the construction of the filter assembly 13 for insertion in and removal from the tank 11 as a unit, rather than merely as individual elements in the conventional manner. For this purpose, the manifold 18 is threaded onto a fitting 40 which is welded at 41 the center of the bottom wall 19 to form the outlet 14, and the upper support wheel 28 for the elements 15 is connected directly to the manifold by a tie rod 42 extending through the center of the assembly. Herein, the tie rod is threaded into a raised boss 43 in the center of the manifold and extends through a center hole 44 in the support wheel 28 with a wing nut 45 threaded onto its upper end. Formed integrally with the underside of the manifold is a downwardly opening, threaded sleeve 47 which receives the upper end portion of the outlet fitting 40.

Thus, the entire assembly 13 is tied together into a unit capable of being assembled outside the tank 11, fitted into place on the outlet fitting 40, and rotated to thread the manifold onto the fitting. For removal, the assembly is simply rotated in the opposite direction and lifted out of the tank.

If, for any reason, it is necessary to replace any individual element 15, it is possible, of course, to remove the support wheel 28 and lift the individual element out of the tank. To simplify insertion of elements in the manifold, suitable stops (not shown) are provided to snap into place when the element is turned to the proper angular position relative to the manifold.

In past filters of the same general shape, access to the filter assemblies has been difficult, and thorough inspection of the assemblies while in the tank has been impossible. To eliminate his difficulty, the tank 11 of the improved filter 10 is formed in two sections 11a and 11b (FIG. 1), each having a closed end 19, 29 and a cylindrical wall constituting a substantial part of the sidewall of the tank when the sections are fitted together. When the upper section or cover 11a is removed, a substantial portion of the filter assembly 13 is exposed for inspection and servicing.

To facilitate sealing of the cover 11a to the lower section 11b of the tank 11, each of the cylindrical walls of the two tank sections has an outwardly turned flange 48, 49 (FIG. 4) disposed at a cross-sectional angle of less than ninety degrees with the inside surface of the tank, and a ring 50 (FIGS. 1 and 4) is fitted inside and welded to one section, herein the lower, to telescope into the other when the tank is closed. A seal ring 51 encircling the insert ring is compressed between the two flanges 48 and 49 automatically as an incident to the positioning of the cover 11b on the tank, and the weight of the cover alone tends to shift the parts into the sealed condition.

Sealing is completed by a split ring 52 of channel-shaped cross-section encircling the tank 11 and having outwardly converging walls 53 straddling the outwardly converging flanges 48 and 49. Thus, when the split clamping ring is drawn tight around the tank by a toggle clamp 54 (FIG. 1), the two sections are squeezed together to squeeze the seal ring 51 into tight sealing engagement with all of the surrounding parts. At the same time, the tank sections remain freely separable upon release of the clamping ring.

From the foregoing, it will be evident that the present invention provides a markedly improved filter 10 in which the adverse effects of settling-out and compaction of diatomaceous earth or other similar filter medium are eliminated, the elements of the filter assembly 13 are supported in the tank for insertion and removal as a unit, and the opening, inspection, closing and sealing of the tank are greatly facilitated as compared to prior competitive filters. It also will be apparent from the foregoing that, while a particular form of the invention has been illustrated and described, various modifications can be made without departing from the spirit and scope of the invention.

We claim as our invention:

1. In a filter for cleaning a flow of liquid with a filter medium susceptible to settling within the filter, the combination of:

a tank having a generally cylindrical sidewall and closed ends defining a filtering chamber, said tank being mountable in an upright position with one of said ends forming a bottom wall;

a filter element assembly disposed in said chamber and substantially filling the latter, said assembly having upright filter elements adapted to be coated with said filter medium and having edges spaced apart to receive fluid between and around the elements;

means for admitting liquid into said tank through said bottom wall at a point spaced a substantial distance outwardly from the center thereof and directing the liquid along a chord of the bottom wall to create a swirling vortical flow of liquid along said bottom wall and rising within said tank thereby to pick up settled-out filter medium from said bottom wall and carry the same upwardly along said elements to recoat the latter;

and means for withdrawing filtered liquid from said tank through said elements.

2. A filter as defined in claim 1 in which said admitting means comprise an inlet opening upwardly through said bottom wall adjacent said sidewall, and a baffle overlying said inlet and positioned to deflect the flow of liquid from said inlet into wiping engagement with said bottom wall between the center thereof and said sidewall.

3. A filter as defined in claim 2 in which said baffle is a plate having a flanged edge portion secured to one side of said inlet opening and a deflector portion overlying said inlet opening and inclined downwardly and inwardly to cause said flow to spread across and impinge against said bottom wall.

4. A filter as defined in claim 1 in which said filter elements are curved inwardly toward the axis of said chamber whereby said assembly is pinwheel-shaped in transverse cross-section, and said admitting means are positioned to cause said liquid to swirl in the same direction as the curvature of said elements for a rising vortical flow within said assembly.

5. A filter as defined in claim 1 in which said withdrawing means comprise a threaded outlet fitting upstanding from the center of said bottom wall, and a manifold threaded onto said outlet fitting and communicating with the interior of each of said elements to receive filtered liquid therefrom.

6. A filter as defined in claim 5 in which each of said elements is releasably secured to said manifold, and further including a support at the upper end of said assembly and holding the upper ends of said elements, and a connector attached to said support and releasably connected through said assembly to said manifold, whereby said fitting supports said assembly in said tank for removal therefrom as a unit.

7. A filter as defined in claim 6 in which said tank is formed in upper and lower sections each having a closed end and a cylindrical wall constituting part of said sidewall when said sections are fitted together, each of said cylindrical walls covering a substantial portion of said assembly whereby removal of said upper section exposes the upper portion of said assembly for inspection and service.

8. In a filter for cleaning a flow of liquid with a filter medium susceptible to settling within the filter, the combination of:
   a generally cylindrical tank having an upright sidewall and closed upper and lower end walls;
   a filter assembly disposed within said tank and having at least one filter element spaced above said lower end wall, said filter element having an outer screen cover for holding a coating of said filter medium to filter liquid passing through the element;
   an inlet for said tank positioned on said lower end wall radially outwardly from the center thereof closely adjacent said sidewall, and including means for directing liquid into said tank adjacent said sidewall along a path between the sidewall and said center thereby to create a swirling vortical flow within said tank across said lower end wall and upwardly within the tank;
   and an outlet for said tank communicating with the interior of said element to receive filtered liquid therefrom.

9. A filter as defined in claim 8 in which said inlet comprises an upwardly opening pipe, and said directing means is a baffle plate having a deflector portion overlying said pipe and positioned to spread the incoming liquid across said bottom wall.

10. In a filter for cleaning a flow of liquid with a filter medium susceptible to settling within the filter, the combination of:
   a tank having a generally cylindrical sidewall and closed end walls defining a filtering chamber, said tank being mountable in an upright position with one of said end walls forming a bottom wall;
   a unitary filter element assembly disposed in said chamber and having
      upright hollow filter elements adapted to be coated with said filter medium, said elements being arcuately curved and positioned in a pinwheel-shaped arrangement within said tank,
      a manifold disposed beneath said elements and releasably supporting the same,
      a support disposed above said elements and positioning the upper ends thereof in spaced relation,
      and a connector tying said support to said manifold to hold said assembly together as a unit;
   an outlet fitting secured to said bottom wall in the center thereof and having a threaded connection with said manifold to support said assembly in said tank, said outlet fitting communicating with said elements through said manifold;
   and inlet means spaced radially outwardly from said outlet fitting closely adjacent said sidewall to admit liquid into said tank adjacent said bottom wall and create a swirling vortical flow of the liquid rising within the tank through said assembly, thereby to redistribute settled-out filter medium on the filter elements.

11. A filter as defined in claim 10 in which said inlet means comprise an upwardly opening pipe adjacent said sidewall, and a deflector overlying said pipe and positioned to deflect incoming liquid across said bottom wall between said sidewall and said outlet fitting.

12. A filter as defined in claim 11 in which said deflector is positioned to create a swirling flow in a direction to rise within said pinwheel-shaped assembly while continuing to swirl.

13. In a filter for cleaning a flow of liquid, the combination of:
   a generally cylindrical tank having closed end walls;
   an outlet fitting secured to one of said end walls and extending through the latter, said fitting having a threaded inner end portion;
   a filter assembly inside said tank including a plurality of filter elements, a manifold disposed below said elements, a support above said elements, and means connecting said support directly to said manifold through said elements;
   and a member on said manifold threaded onto said outlet fitting thereby to support said filter assembly in said tank for rotation as a unit into and out of assembled condition.

References Cited

UNITED STATES PATENTS

| | | | |
|---|---|---|---|
| 1,972,057 | 8/1934 | Somers | 210—512 |
| 2,801,764 | 8/1957 | Russell et al. | 210—232 X |
| 2,954,896 | 10/1960 | Russell et al. | 210—232 X |
| 3,202,284 | 8/1965 | Wade | 210—346 X |

JAMES L. DE CESARE, Primary Examiner

U.S. Cl. X.R.

210—346